Feb. 27, 1951        J. B. HUTAFF        2,543,578

BOTTLE HANDLING APPARATUS

Filed July 17, 1947

INVENTOR.
BY JULIAN B. HUTAFF

H. G. Lombard
ATTORNEY

Patented Feb. 27, 1951

2,543,578

UNITED STATES PATENT OFFICE 2,543,578

BOTTLE HANDLING APPARATUS

Julian B. Hutaff, Fayetteville, N. C., assignor to Julian's Incorporated, Fayetteville, N. C., a corporation of North Carolina Application July 17, 1947, Serial No. 761,462

1 Claim. (Cl. 214—1.1)

This invention relates in general to bottle handling apparatus and deals, more particularly, with improvements in apparatus or devices for unloading or transferring bottles and similar articles in multiple by a simple and expeditious procedure requiring only a minimum of time and effort.

The invention has particular application and use in the handling of various well known types of refillable bottles, such as soft drink bottles, milk bottles, etc., and bottles for any other purpose which include in their design a generally cylindrical neck provided with an annular, outwardly projecting bead or rib adjacent the open or capped end thereof.

A primary object of the invention is for the provision of an improved, highly simplified bottle handling apparatus which provides for a convenient, easy and speedy operation in effecting the transfer and movement of a group of such bottles in upright position from one appliance to another as, for example, in the unloading of an entire case of bottles from a bottle carrying case directly onto a conveyor or other means for advancing the bottles to a washing machine, filling apparatus, labelling machine, or the like.

Another object of the invention is to provide a bottle handling apparatus of the kind described by which an entire case of bottles may be unloaded from a bottle carrying case, easily and quickly, in a single operation, and with the removed bottles all in upright position and disposed in uniform aligned relation for proper introduction to a washing machine or other apparatus.

A further object of the invention is to provide a bottle unloading apparatus of this character having means for guiding and directing the movement of the bottles in upright aligned position and means for moving the bottles in such aligned relation.

An additional object of the invention is to provide such a bottle unloading apparatus in which the guided movement of the bottles in such upright aligned relation is effected automatically.

Another object of the invention is to provide a bottle handling apparatus having all the foregoing described features and advantages and which comprises a simple, fool-proof and reliable construction that may be manufactured at relatively low cost either as a separate bottle unloading apparatus or as a highly practical and advantageous attachment to bottle washing machines and other apparatus already in use in bottling plants, or the like.

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which.

Figure 1:
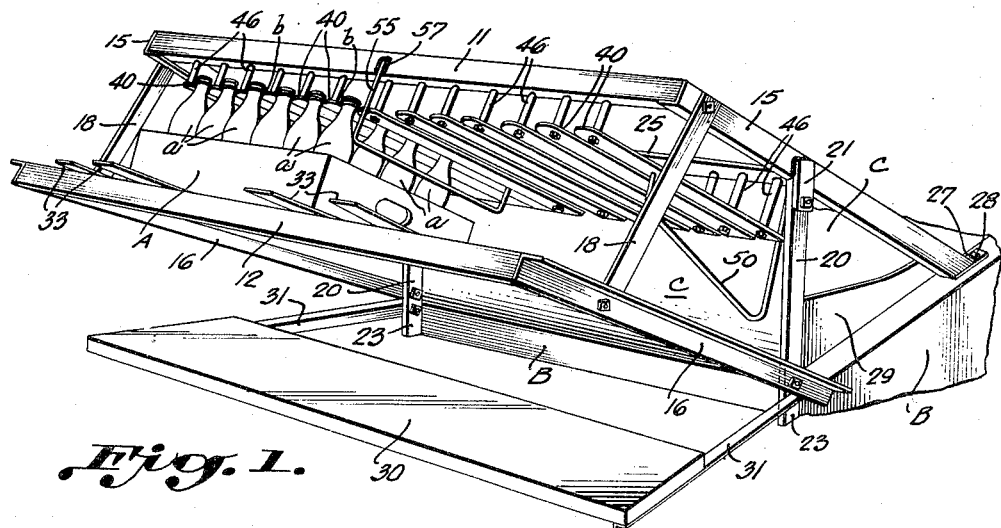
Fig. 1 is a front perspective view of the improved bottle handling apparatus of the invention.

Referring now, more particularly, to the drawings, Fig. 1 shows the general organization of the improved bottle handling apparatus as provided in a preferred construction, by way of example only, in which the apparatus is designed to accommodate two bottle carrying cases A at the same time for purposes of unloading the bottles from the cases and transferring the same in uniform upright position to a washing machine or other apparatus. Loaded cases A of empty bottles are introduced to the bottle unloading apparatus in continuous succession as desired, using either or both of the two passageways or chutes provided for in the illustrated construction of the apparatus. Likewise, similar constructions may be provided for only one line of bottle carrying cases A, or for accommodating three, four or more lines of cases in side by side relation as may be necessary or desirable for any particular application or installation.

The invention is disclosed in association with the bed B of a bottle washing machine and an endless conveyor belt or platform C adjacent to or supported on said bed B for advancing empty bottles to the washing machine for the usual cleansing operation. The bottle unloading apparatus is shown constructed as an attachment to such a machine, but it is to be understood that the invention is not in any way limited to the specific construction illustrated for an attachment of this character but rather, may be readily provided in other similar and related constructions either as an attachment or as a unitary accessory mounted on a separate support in any suitable way for use with various types of bottle processing machines, apparatus and equipment in general.

In the present example, the bottle unloading apparatus comprises a generally rectangular, box-like, frame structure which is completely open at the rearward end thereof adjacent the conveyor C to permit the unimpeded movement of the unloaded bottles directly onto said conveyor. Such a frame may be provided in any suitable construction and the arrangement shown in Fig. 1 is a highly simplified and relatively inexpensive construction provided by spaced upper and lower cross bars 11, 12, joined with spaced upper and lower side bars 15, 16, respectively, at either side of the apparatus. The upper frame portion, accordingly, consists of cross bar 11 and side bars 15 while the lower frame portion comprises the cross bar 12 and side bars 16 defining an open base to the frame structure. Preferably, the side arms 16 of the base are of sufficient length to support the lower cross bar 12 in outwardly offset relation to the upper cross bar 11. The upper and lower frame portions are supported in suitable spaced relation adjacent the forward ends by struts 18 bolted or otherwise secured to the upper and lower side bars 15, 16 respectively. Similarly, at the rear of the frame, posts 20 maintain the upper and lower frame portions in spaced relation and these posts preferably are secured at their upper ends by bolted braces 21 for increased strength and include projections 23 on their lower ends serving as shoulders or abutments for supporting the frame structure in mounted position on the bed B. A cross plate 25 is mounted at the rear of the upper frame portion in any suitable manner, preferably by securing the ends of said plate to the side bars 15 in a manner whereby said cross plate 25 strengthens and rigidifies the rearward portion of the frame structure.

The upper side bars 15 are of suitable length to extend rearwardly as necessary for connection to the bed B of the washing machine or other apparatus, as, for example, by integral flanges 27 provided by bent ends on said side bars 15 and which are secured by stud bolts 28 anchored in the side walls of said bed B. Preferably each side of the frame structure adjacent the conveyor C is provided with a guard plate 29, or the like, which is attached in any suitable way to the side bar 15 and post 20.

Figure 2:
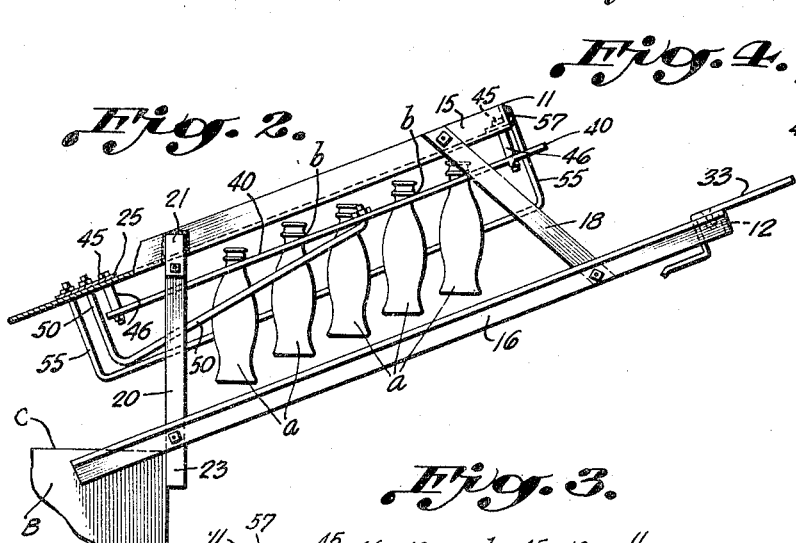
Fig. 2 is a fragmentary side view of the apparatus as seen from the left of Fig. 1.

It will be understood from Fig. 1 that the general frame structure thus provided is designed to be mounted on the bed B in the manner of a downwardly inclined chute leading to the endless conveyor C. To this end, the upper side bars 15 are disposed in downwardly inclined relation to the bed B to bear thereon while the posts 20 are in vertical relation thereto with the lower projections 23 on said posts in abutting engagement with the outer face of said bed B. The angularly related upper side bar 15 and post 20 at either side of the frame structure, accordingly, define a bracket which rigidly supports the apparatus in operative position on the bed B and which is secured in such position by the stud bolts 28, as aforesaid. A forward platform 30 also may be provided and, if desired, mounted on the frame structure as by supporting bars 31 bolted to the lower ends of the posts 20. Such a platform is adapted to receive the unloaded bottle carrying cases A after the bottles have been removed therefrom in the use of the apparatus, as presently to be described, and of course, equivalent means for receiving the empty cases may be provided in any other suitable way. On the lower cross bar 12 of the frame structure there may be provided pairs of shelves 33, or the like, leading to each passageway for the bottle carrying cases. These shelves 33 are convenient and advantageous for supporting and guiding the cases of bottles in the initial application thereof to the apparatus for the bottle unloading operation. As shown in Fig. 2, such a shelf is readily provided in the manner of a simple bracket which is bolted or otherwise secured to the flange on the cross bar 12.

Figure 3:
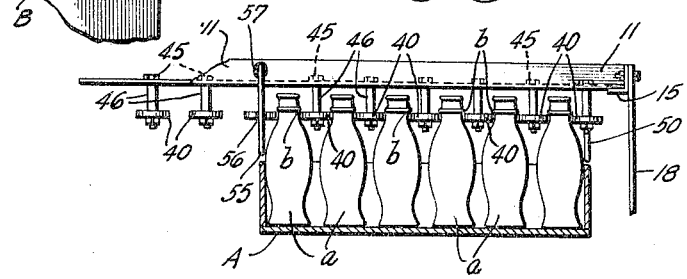
Fig. 3 is a fragmentary front view of Fig. 1 showing the apparatus as seen on a horizontal parallel to the bottle unloading slides; and, Fig. 4 is an enlarged sectional view of the spacer sleeve device used in mounting the guide elements of the bottle unloading structure shown in Figs. 1–3 inclusive.

Within the frame structure thus provided, the bottle unloading apparatus comprises a series of similar elongate bottle supporting slide members 40 depending from the upper frame portion 11, 15, in equally spaced, parallel relation in a manner whereby the space between each pair of slide members 40 defines a slideway through which the necks of the unloaded bottles may pass. The spacing of each slideway is of a width slightly larger than necessary to accommodate the neck of a bottle *a* immediately below the outwardly projecting rib or bead *b* thereon adjacent the open or capped end of the bottle. Accordingly, as best seen in Fig. 3, when any bottle or bottles *a* in a group are positioned in the slideways defined by the spaces between the spaced slide members 40, the said annular beads or ribs *b* on the bottles are adapted to ride on and slide along the adjacent edges of the slide members under force of gravity or, under manual force. The slide members 40 are disposed in downwardly inclined relation by virtue of the downwardly inclined mounting of the frame structure as shown in Fig. 1, and accordingly, when the unloaded bottles are suspended on the slide members 40, as aforesaid, the bottles move automatically by force of gravity to the lower end of frame structure in position to pass onto the conveyor C in upright aligned relation.

Figure 4:
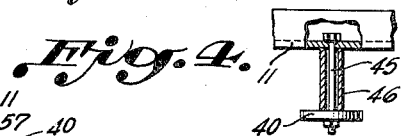

The slide members 40 may be provided in any suitable form in the manner of a rod, rail, strip, bar, or the like, and in the present example, said slide members comprise narrow strip-like plates the outer ends of which terminate in inwardly tapered rounded extremities that define a flared, funnel shaped spacing at the forward ends of the spaced slide members which facilitates the initial step of positioning and inserting the necks of the bottles between said slide members. The slide members 40 are mounted within the frame structure in any suitable way, preferably by attachment of their forward ends to the upper cross bar 11 and their rearward ends to the cross plate 25. The slide members 40 are secured and rigidly supported in this manner in a preferred construction shown in Fig. 4 by means of bolts 45 together with spacer sleeves 46. The bolts 45 are passed through openings provided in predetermined spaced relation in the lower flange of the cross bar 11 and in the cross plate 25. As shown in Fig. 4, a sleeve 46 is telescoped over the bolt shank 45 and the slide member 40 then attached to the bolt through a bolt passage therein whereupon the associated nut is applied to the bolt to clamp the slide member 40 against the extremity of said sleeve 46 in strong and rigid mounted position within the frame structure.

Preferably the sides of the frame are provided with guide rails 50 attached to the outer slide member 40 at each side of the apparatus. Such a guide rail is readily provided by a suitably bent section of rod material having the ends thereof threaded to receive nuts for attaching the forward end thereof to the associated slide member 40, as shown in Fig. 2 and its rearward end to the cross plate 25. Also mounted within the frame structure, is a similar centrally located rail 55 serving as a partition that divides the frame into two sections defining the path of the chute or passageway for each line of bottle carrying cases applied to the apparatus. This central rail or partition 55, likewise may comprise a rod threaded at its rearward end to receive a nut for attaching the same to the cross plate 25 and extends through the frame to the front of the apparatus and thence upwardly through a slot 56 in the end of the central slide member 40, Fig. 3, with the forward end thereof secured to the outer face of the upper cross bar 11 in any suitable manner as by welding 57, or other fastening means.

In the use of the apparatus, it will be understood from the foregoing that bottle carrying cases A, containing empty bottles to be subjected to a washing or other operation are introduced to the bottle unloading means through one or both of the chutes or passageways on either side of the central partition 55. A line of bottle carrying cases in succession is passed through such chute or passageway by a worker who first places each case of bottles on the pair of spaced shelves or rests 33, as shown in Fig. 1, in a position in which the necks of the bottles, as aligned in rows within the case, are substantially in line with the longitudinal passages or slideways between the slide members 40.

In this initial position the bottles are so supported that the projecting beads or annular ribs *b* thereon extend slightly above the slide surfaces or tracks defined by the parallel longitudinal edges of the spaced slide members 40. The bottle carrying case otherwise is adapted to move downwardly on the shelves or rests 33 under force of gravity, whereupon the necks of the aligned bottles in each row pass into the respective slideways or longitudinal passages defined by the spaced slide members 40 with which the rows of bottles were previously aligned, as aforesaid. The entrance of the necks of the bottles into the slideways is facilitated by the outwardly flared entrance openings defined by the inwardly tapered extremities on the slide members 40 which guide and slightly shift the bottles, as necessary, to dispose the necks of the bottles in suitable position for ready entrance into the respective slideways. The necks of the bottles in rows thus enter the slideways with the bead *b* on the neck of each bottle slightly above the adjacent slide surfaces defined by the longitudinal edges of the spaced slide members 40.

When all bottles in a case have entered the slideways, the case is allowed to drop through the open base within the lower cross bar 12 and between the side bars 16 onto the case receiving platform 30, or the like. The beads or ribs *b* on the necks of the bottles, accordingly, are engaged by the adjacent parallel longitudinal slide surfaces or edges of the longitudinal slide members 40 to be suspended thereby and with said beads adapted to ride or slide on said longitudinal slide surfaces. The weight of the bottles in such suspended position necessarily causes the same to assume a substantially vertical position. Inasmuch as the beads on the necks of the bottles are adapted to ride on said slide surfaces of the slide members 40, the bottles move automatically downwardly under force of gravity by reason of the downwardly inclined mounting of said slide members. The bottles slide in substantially vertical position to the lower inner ends of the slide members 40 where they leave said slide members and pass, in such vertical position, directly onto the conveyor C or other platform. The passage of the bottles onto the conveyor in vertical position is important in many instances, in that the bottles are thus disposed in upright relation ready to be received for processing by the washing machine or other apparatus without need for further handling.

It will be appreciated that in the use of the improved bottle unloading apparatus of the invention, the described procedure for unloading an entire case of bottles in a single, expeditious operation is easily performed in a matter of seconds. In a bottling plant, for example, where a great number of cases of empty bottles must be unloaded daily preparatory to the required washing operation, the use of bottle unloading apparatus in accordance with the present invention is highly desirable and advantageous and results in considerable savings in operating costs and expenses in that any such unloading is accomplished in relatively little time and by a minimum number of workers.

While the invention has been described in detail with a specific example, such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claim rather than by the foregoing description, with all changes falling within the scope, meaning, and range of equivalency of the claim intended to be embraced therein.

What is claimed and desired to be secured by United States Letters Patent is:

Bottle handling apparatus comprising a frame structure defining a chute for a bottle carrying case and including guide means for said case and the bottles therein, said frame structure comprising an open base and spaced forward and rearward cross members above said base, spaced longitudinal members mounted by said cross members, bolt and spacer sleeve devices securing the forward ends of said longitudinal members below and in spaced relation to the forward cross member and the rearward ends thereof below and in spaced relation to the rearward cross member, said spaced longitudinal members defining bottle passages therebetween and each of said passages being open at both ends for receiving the necks of a row of bottles at one end and discharging the same at the other end thereof, said spaced longitudinal members comprising spaced parallel slide surfaces forming said bottle passages and extending in downwardly inclined relation to the horizontal and adapted to engage projections on the necks of the bottles to suspend the bottles thereon and in slidable relation thereto under force of gravity, said longitudinal members having their forward ends shaped to define enlarged entrances to facilitate the entering of the necks of the bottles between said spaced parallel slide surfaces.

JULIAN B. HUTAFF.

REFERENCES CITED

The following references are of record in the file of this patent:

UNITED STATES PATENTS

| Number | Name | Date |
| --- | --- | --- |
| 1,593,825 | Higgins | July 27, 1926 |
| 1,597,235 | Krieger | Aug. 24, 1926 |
| 1,783,806 | Loebe et al. | Dec. 2, 1930 |
| 1,938,947 | Whitmore | Dec. 12, 1933 |
| 2,213,774 | Taylor | Sept. 3, 1940 |
| 2,311,449 | Lilly | Feb. 16, 1943 |
| 2,354,103 | Butler | July 18, 1944 |
| 2,377,431 | Lakso | June 5, 1945 |
| 2,426,356 | Kelly | Aug. 26, 1947 |